May 16, 1944. R. R. GUNDERSON 2,349,167
TRACTOR-TRAILER BRAKE SYSTEM
Filed Sept. 21, 1942
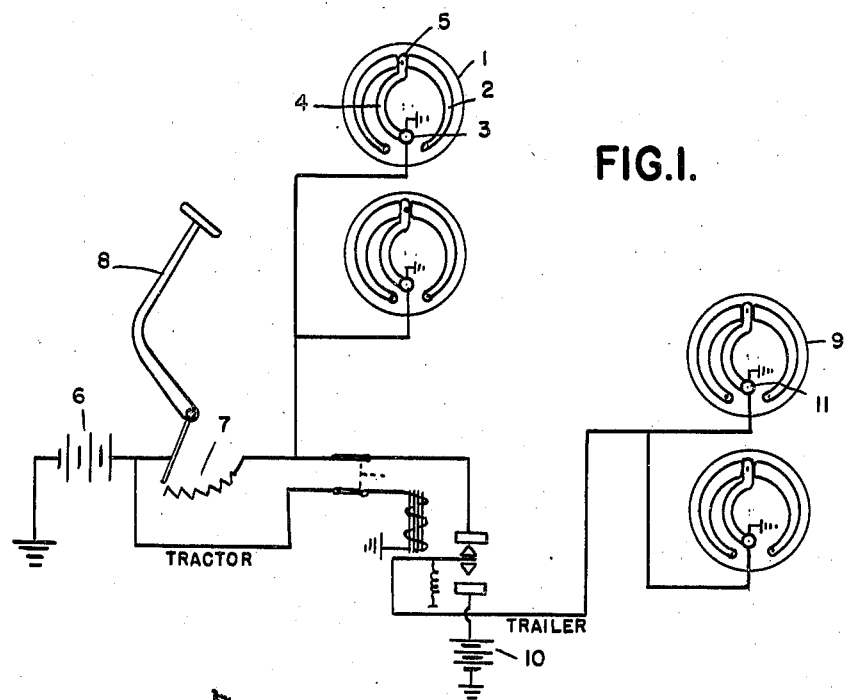
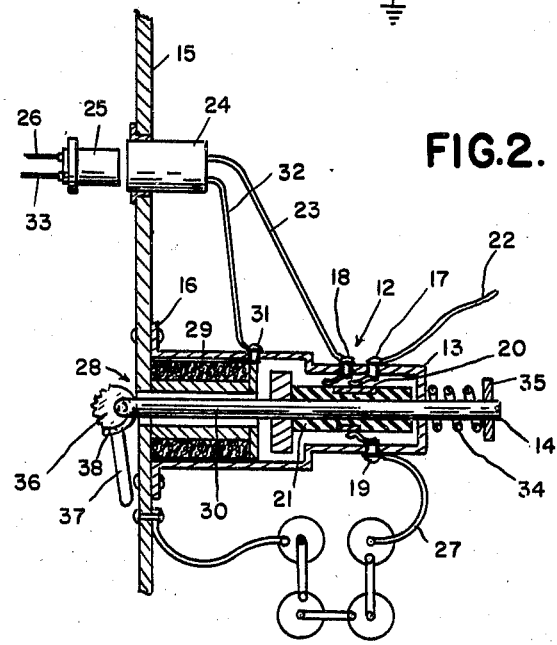
INVENTOR.
RALPH R. GUNDERSON
BY
ATTORNEYS Patented May 16, 1944

2,349,167

UNITED STATES PATENT OFFICE 2,349,167

TRACTOR-TRAILER BRAKE SYSTEM

Ralph R. Gunderson, Detroit, Mich.

Application September 21, 1942, Serial No. 459,169

5 Claims. (Cl. 188—3)

The invention relates to tractor-trailer brake systems in which the trailer has an electrically operated brake and refers more particularly to an automatic switch in a tractor-trailer brake system for preventing accidents in the event that the tractor and trailer become uncoupled.

The invention has for one of its objects to provide an automatic switch which is operable to apply a brake of the trailer in the event that the tractor and trailer become uncoupled by closing a circuit including the trailer brake and a normally idle source of electric energy on the trailer.

The invention has for another object to provide a switch the operation of which is controlled by a source of electric energy on the tractor so that if the circuit, including the switch and source of electric energy, is broken either by disconnecting the electric coupler for the tractor and trailer brake system or by breaking a wire of the circuit, the switch operates to close the electric circuit including the trailer brake and the trailer source of electric energy.

The invention has for a further object to provide an improved construction of switch the operation of which may also be manually controlled.

These and other objects of the invention will become apparent from the following description, taken in connection with the accompanying drawing, in which Figure 1 is a diagrammatic view of a tractor-trailer brake system embodying my invention;

Fig. 2 is a sectional view.

The invention is particularly applicable to tractor trailer brake systems in which the tractor is a commercial truck of conventional design equipped with conventional brakes which may be mechanically, hydraulically, or electrically operated. As illustrated, each brake is electrically operated and comprises the brake drum 1 mounted on and secured to a tractor wheel, the internal brake shoes 2 pivoted at their lower ends upon the backing plate. and the electromagnet 3 having the arm 4 pivoted upon the backing plate and provided with the cam 5 engageable with the upper ends of the brake shoes to separate the same to thereby force the brake shoes against the brake drum when the electromagnet is energized. The tractor is also equipped with a suitable source of electric energy, such as the storage battery 6, and for controlling the circuit including the electromagnet 3 and the storage battery 6 I have provided the rheostat 7, the movable part of which is actuated by the brake pedal 8 of the tractor.

The trailer is also of conventional design and may be four-wheeled or two-wheeled and is adapted to be mechanically coupled to the tractor in any usual manner. The trailer is equipped with the conventional electric brakes 9 which, as shown are constructed in the same manner as the electric brakes of the tractor. The trailer is also equipped with a suitable source of electric energy, such as the dry-cell battery 10 which is normally idle, but is adapted to be connected in circuit with the electromagnets 11 of the brakes 9.

To control the operation of the trailer brakes, I have provided the automatic switch 12 upon the trailer. The switch has the casing 13 and the longitudinally movable rod 14 extending axially through the casing and also through the bar 15 of the trailer. The casing has the foot flange 16 which is fixedly secured to the bar 15 by suitable means, such as rivets. 17 and 18 are contacts at one side of and spaced longitudinally with respect to the casing, the contacts being fixedly mounted on and insulated from the casing. 19 is a third contact at the side of the casing opposite the contacts 17 and 18 and fixedly mounted on and insulated from the casing. The third contact is located substantially in the same longitudinal zone of the casing as the contact 17. 20 is a movable contact in the nature of a ring mounted on the sleeve 21 formed of suitable insulation material and fixed on the rod 14. The movable contact has a width which is greater in the zone of engagement with the contacts 17 and 18 than in the zone of engagement with the contact 19 and these zones are positioned so that the movable contact 20 may engage the contacts 17 and 18 and clear the contact 19, or may engage the contacts 17 and 19 and clear the contact 18. The contacts 17, 18 and 19 are preferably resilient. The contact 17 is connected to the wire 22 leading to the electromagnets 11 of the trailer brakes. The contact 18 is connected to the wire 23 leading to the socket 24 fastened to the bar 15 of the trailer and forming with the plug 25 an electric coupler having cooperating contacts for connecting the wire 23 to the wire 26 leading from the plug 25 to the controller on the tractor, the controller in the present instance being the rheostat 7. The contact 19 is connected to the wire 27 leading to the battery 10. 28 is a solenoid for controlling the operation of the switch. The solenoid comprises the winding 29 within the casing 13 at the end adjacent the bar 15 of the trailer and the core 30 extending through the winding and, as shown, forming an integral part of the rod 21. One end of the winding is grounded by being connected to the bar 15 of the trailer and the other end of the winding is secured to the rivet 31 which is carried by and insulated from the casing 13. This rivet is connected to the wire 32 leading to a contact in the socket 24 which is detachably engageable with a contact carried by the plug 25. The latter contact is connected to the wire 33 leading to the storage battery 6 of the tractor. The solenoid when energized holds the movable contact in a position bridging the contacts 17 and 18 and clearing the contact 19 so that with the electric coupler closed or in operative position the circuit, including the electromagnets of the trailer brakes and the rheostat of the tractor is closed. As a result, when the tractor brakes are operated the trailer brakes will also be operated.

For closing the circuit including the electromagnets of the trailer brakes and the battery of the trailer in the event that the circuit including the trailer electromagnets and the storage battery of the tractor is opened, either by uncoupling of the plug 25 and socket 24 or by breaking of the wires 32 or 33, I have provided the coil spring 34. The coil spring 34 encircles the end of the rod 21 beyond the casing 13 and abuts the end of the casing and the collar 35 upon the rod.

To manually control the switch 12 when the trailer is uncoupled from the tractor, I have provided the eccentric 36 pivoted upon the portion of the rod 21 extending beyond the bar 15 of the trailer and engageable with the bar upon clockwise rotation to longitudinally move the movable contact 20 against the resistance offered by the coil spring 34. The eccentric is provided with the handle 37 and also with the spring 38 for resiliently urging the eccentric in a counterclockwise direction. In the normal or off position of the eccentric and handle, as shown in Figure 2, the movable contact 20 bridges the contacts 17 and 19 and clears the contact 18. When the eccentric and handle have been swung in a clockwise direction the movable contact is held in engagement with the contacts 17 and 18 and clears the contact 19 at which time the circuit, including the trailer brakes and the trailer battery, is open. If the trailer is coupled to the tractor and the electric plug and socket are engaged, the eccentric is released from the trailer bar through the energization of the solenoid which moves the rod 21 a sufficient distance to effect the release. Upon the release the spring 38 returns the eccentric in a counterclockwise direction to its off position. It will thus be seen that the movement of the eccentric from its applied position to its off position is automatic upon connecting the electric coupler plug and socket of the tractor and trailer.

In operation when the trailer is coupled to the tractor and the electric coupler plug is inserted in the electric coupler socket, the manual control for the automatic switch is in off position so that upon depressing the tractor brake pedal the electric circuits, including the tractor brakes and tractor battery and also including the trailer brakes and tractor battery, are closed to apply the brakes of both the tractor and trailer inasmuch as the circuit including the solenoid for the switch and the tractor battery is closed. However, if the electric coupler plug is removed from its socket because the trailer has become disengaged from the tractor, or if either of the wires 32 or 33, and especially the latter, becomes broken, the solenoid is deenergized and allows the spring of the switch to move the movable contact to a position closing the circuit, including the trailer brakes and the trailer battery, thereby applying the trailer brakes and preventing an accident. It is also apparent that when the trailer is uncoupled from the tractor the eccentric for controlling the switch forms a manual control for the trailer brakes and that the eccentric may be manually swung in a clockwise direction from its normal or off position closing the circuit including the trailer brakes and the trailer battery to a position opening the circuit and releasing the trailer brakes and manually returned in a counterclockwise direction to its normal or off position to again apply the trailer brakes. It is further apparent that the manual control for the automatic switch cannot be accidentally left in applied position when the solenoid of the switch is energized and as a result the desired automatic operation of the switch is assured.

What I claim as my invention is:

1. In a tractor-trailer brake system of the type wherein the tractor is equipped with a source of electric energy and the trailer is equipped with a brake and a normally idle source of electric energy for operating the trailer brake, an automatic switch having a contact movable to a position to close a circuit including the trailer brake and the tractor source of electric energy and also movable to a position to close a circuit including the trailer brake and the trailer source of electric energy, electrically operated means in circuit with the tractor source of electric energy for holding said contact in said first mentioned position, and means for moving said contact to said second mentioned position when said electrically operated means is deenergized.

2. In a tractor-trailer brake system of the type wherein the tractor is equipped with a brake, a source of electric energy for operating the brake and manually operable means movable to closed position for closing the circuit including the brake and the source of electric energy and wherein the trailer is equipped with a brake and a normally idle source of electric energy for operating the trailer brake, an automatic switch having a contact movable to a position to close a circuit including the trailer brake and the tractor source of electric energy when the manually operable means is moved to closed position, electrically operated means in circuit with the tractor source of electric energy for holding said contact in said position, and means for moving said contact from said position to a second position closing a circuit including the trailer brake and the trailer source of electric energy when said electrically operated means is deenergized.

3. In a tractor-trailer brake system of the type wherein the tractor is equipped with a brake, a source of electric energy for operating the brake and a manually operable rheostat movable to closed position for closing a circuit including the brake and the source of electric energy and wherein the trailer is equipped with a brake and a normally idle source of electric energy for operating the brake, an automatic switch having a contact movable to a position to close a circuit including the trailer brake and the tractor source of electric energy when the rheostat is closed, a solenoid in circuit with the tractor source of electric energy for holding said contact in said position, and means operable when said solenoid is deenergized to move said contact to a second position to open the circuit including the trailer brake and the tractor source of electric energy and to close a circuit including the trailer brake and the trailer source of electric energy.

4. In a tractor-trailer brake system of the type wherein the tractor is equipped with a source of electric energy and the trailer is equipped with a brake and a normally idle source of electric energy for operating the trailer brake, an automatic switch having a contact movable to a position to close a circuit including the trailer brake and the tractor source of electric energy and also movable to a position to close a circuit including the trailer brake and the trailer source of electric energy, electrically operated means energized by the tractor source of electric energy for holding said contact in said first mentioned position, means for moving said contact to said second mentioned position when said electrically operated means is deenergized, and manually operable means operatively connected to said movable contact to move the same.

5. In a tractor-trailer brake system of the type wherein the tractor is equipped with a source of electric energy and the trailer is equipped with a brake and a normally idle source of electric energy for operating the trailer brake, an automatic switch having a contact movable to a position to close a circuit including the trailer brake and the tractor source of electric energy and to open a circuit including the trailer brake and the trailer source of electric energy, said contact also being movable to a second position to open the circuit including the trailer brake and the tractor source of electric energy and to close the circuit including the trailer brake and the trailer source of electric energy, electrically operated means in circuit with and energized by the tractor source of electric energy for holding said contact in said first mentioned position, means for moving said contact to said second mentioned position when said electrically operated means is deenergized, and means manually movable from off position to hold said contact is said first mentioned position, said last mentioned means being automatically movable to off position when said electrically operated means is energized.

RALPH R. GUNDERSON.